US012627580B2

(12) United States Patent
Schornig et al.

(10) Patent No.: US 12,627,580 B2
(45) Date of Patent: May 12, 2026

(54) DYNAMIC CLASSIFICATION OF ONLINE APPLICATIONS BASED ON APPLICATION BEHAVIOR FOR COGNITIVE NETWORKS

(71) Applicant: Cisco Technology, Inc., San Jose, CA (US)

(72) Inventors: Eduard Schornig, Haarlem (NL); Jean-Philippe Vasseur, Combloux (FR); Grégory Mermoud, Venthône (CH); Pierre-André Savalle, Rueil-Malmaiso (FR)

(73) Assignee: Cisco Technology, Inc., San Jose, CA (US)

( * ) Notice: Subject to any disclaimer, the term of this patent is extended or adjusted under 35 U.S.C. 154(b) by 41 days.

(21) Appl. No.: 18/585,615

(22) Filed: Feb. 23, 2024

(65) Prior Publication Data

US 2025/0274360 A1 Aug. 28, 2025

(51) Int. Cl.
*H04L 41/5067* (2022.01)
*H04L 41/082* (2022.01)
*H04L 41/147* (2022.01)
(52) U.S. Cl.
CPC ........ *H04L 41/5067* (2013.01); *H04L 41/082* (2013.01); *H04L 41/147* (2013.01)

(58) Field of Classification Search
None
See application file for complete search history.

(56) References Cited

U.S. PATENT DOCUMENTS

| | | |
|---|---|---|
| 2010/0268524 A1 | 10/2010 | Nath et al. |
| 2015/0222720 A1 | 8/2015 | Broda et al. |
| 2017/0244777 A1 | 8/2017 | Ouyang et al. |
| 2019/0123972 A1* | 4/2019 | Parandehgheibi .... G06F 9/4856 |
| 2020/0274783 A1 | 8/2020 | Sharma et al. |
| 2020/0336396 A1 | 10/2020 | Su et al. |
| 2022/0150151 A1* | 5/2022 | Ramamoorthy ..... G06Q 30/016 |
| 2022/0217610 A1* | 7/2022 | Zheng .................... H04L 45/64 |
| 2023/0370338 A1* | 11/2023 | Shori .................. H04L 41/0661 |
| 2024/0430712 A1* | 12/2024 | Chandran ............. H04W 24/08 |

* cited by examiner

*Primary Examiner* — Fadi Haj Said
(74) *Attorney, Agent, or Firm* — Merchant & Gould P.C.; Kenneth J. Heywood

(57) ABSTRACT

In one embodiment, a device determines a type of content being accessed by an endpoint client within an online application during a particular period of time. The device selects a quality of experience prediction model for the online application, based on the type of content being accessed during the particular period of time. The device uses the quality of experience prediction model to predict a quality of experience metric for the online application. The device causes a configuration change in a network based on the quality of experience metric.

20 Claims, 11 Drawing Sheets

400

500

Application Experience Optimization Process 248

Web Application Telemetry Module 502

Application Behavior Classifier 504

QoE Inference Engine 506

Application Telemetry 508

User Interface 510

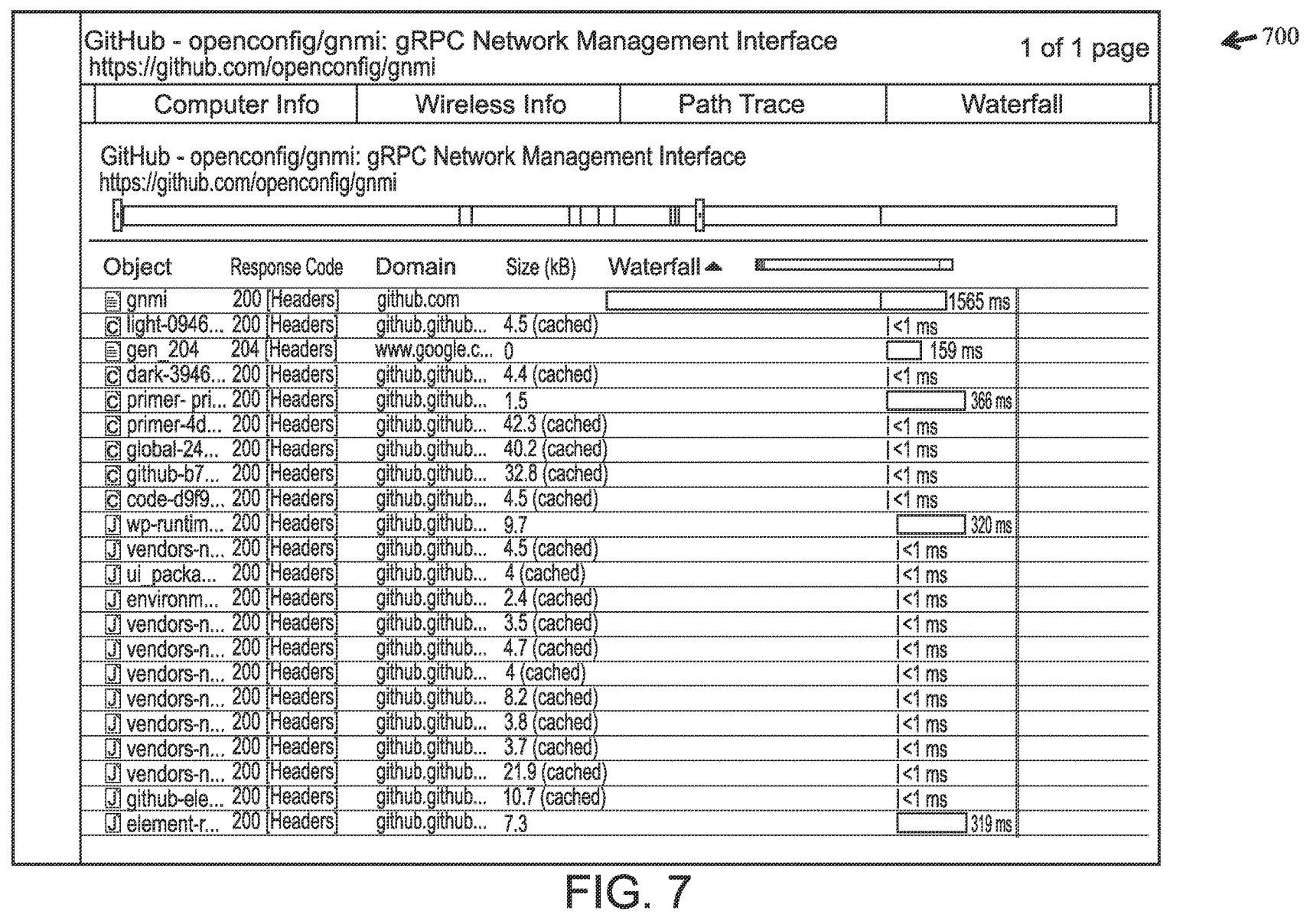

700

GitHub - openconfig/gnmi: gRPC Network Management Interface     1 of 1 page

| Computer Info | Wireless Info | Path Trace | Waterfall |
|---|---|---|---|

GitHub - openconfig/gnmi: gRPC Network Management Interface
https://github.com/openconfig/gnmi Waterfall ▲

| Object | Response Code | Domain | Size (kB) | Waterfall |
|---|---|---|---|---|
| gnmi | 200 [Headers] | github.com | | 1565 ms |
| light-0946... | 200 [Headers] | github.github... | 4.5 (cached) | <1 ms |
| gen_204 | 204 [Headers] | www.google.c... | 0 | 159 ms |
| dark-3946... | 200 [Headers] | github.github... | 4.4 (cached) | <1 ms |
| primer-pri... | 200 [Headers] | github.github... | 1.5 | 366 ms |
| primer-4d... | 200 [Headers] | github.github... | 42.3 (cached) | <1 ms |
| global-24... | 200 [Headers] | github.github... | 40.2 (cached) | <1 ms |
| github-b7... | 200 [Headers] | github.github... | 32.8 (cached) | <1 ms |
| code-d9f9... | 200 [Headers] | github.github... | 4.5 (cached) | <1 ms |
| wp-runtim... | 200 [Headers] | github.github... | 9.7 | 320 ms |
| vendors-n... | 200 [Headers] | github.github... | 4.5 (cached) | <1 ms |
| ui_packa... | 200 [Headers] | github.github... | 4 (cached) | <1 ms |
| environm... | 200 [Headers] | github.github... | 2.4 (cached) | <1 ms |
| vendors-n... | 200 [Headers] | github.github... | 3.5 (cached) | <1 ms |
| vendors-n... | 200 [Headers] | github.github... | 4.7 (cached) | <1 ms |
| vendors-n... | 200 [Headers] | github.github... | 4 (cached) | <1 ms |
| vendors-n... | 200 [Headers] | github.github... | 8.2 (cached) | <1 ms |
| vendors-n... | 200 [Headers] | github.github... | 3.8 (cached) | <1 ms |
| vendors-n... | 200 [Headers] | github.github... | 3.7 (cached) | <1 ms |
| vendors-n... | 200 [Headers] | github.github... | 21.9 (cached) | <1 ms |
| github-ele... | 200 [Headers] | github.github... | 10.7 (cached) | <1 ms |
| element-r... | 200 [Headers] | github.github... | 7.3 | 319 ms |

FIG. 7

DYNAMIC CLASSIFICATION OF ONLINE APPLICATIONS BASED ON APPLICATION BEHAVIOR FOR COGNITIVE NETWORKS

TECHNICAL FIELD

The present disclosure relates generally to computer networks, and, more particularly, to the dynamic classification of online applications based on application behavior for cognitive networks.

BACKGROUND

Traditionally, service level agreement (SLA) thresholds regarding path metrics like loss, latency, and jitter, have been used as proxies for the user experience of online applications, such as those served using a software-as-a-service (SaaS) model. For instance, if the packet loss is greater than a defined threshold, it is assumed that a user of the application would deem their experience with the application as unsatisfactory. This is not always the case, though. For instance, certain codecs are now resilient to packet loss, meaning that the user may not even notice a decrease in performance.

With the recent advancements in machine learning, it now becomes possible to predict the user experience of such online applications. However, the diversity and number of online applications available today makes doing so quite challenging. Indeed, there can be hundreds or even thousands of such applications in use in any enterprise network environment, with applications being added or removed, constantly. Analyzing and building prediction models for thousands of individual web application poses scaling concerns in terms of both time and effort while, at the same time, attempting to build a single model that can cover all types of applications may be unfeasible.

BRIEF DESCRIPTION OF THE DRAWINGS

The embodiments herein may be better understood by referring to the following description in conjunction with the accompanying drawings in which like reference numerals indicate identically or functionally similar elements, of which:

FIG. 7 illustrates an example of HTTP archive resource (HAR) telemetry; and

DESCRIPTION OF EXAMPLE EMBODIMENTS

Overview

Figure 1A:
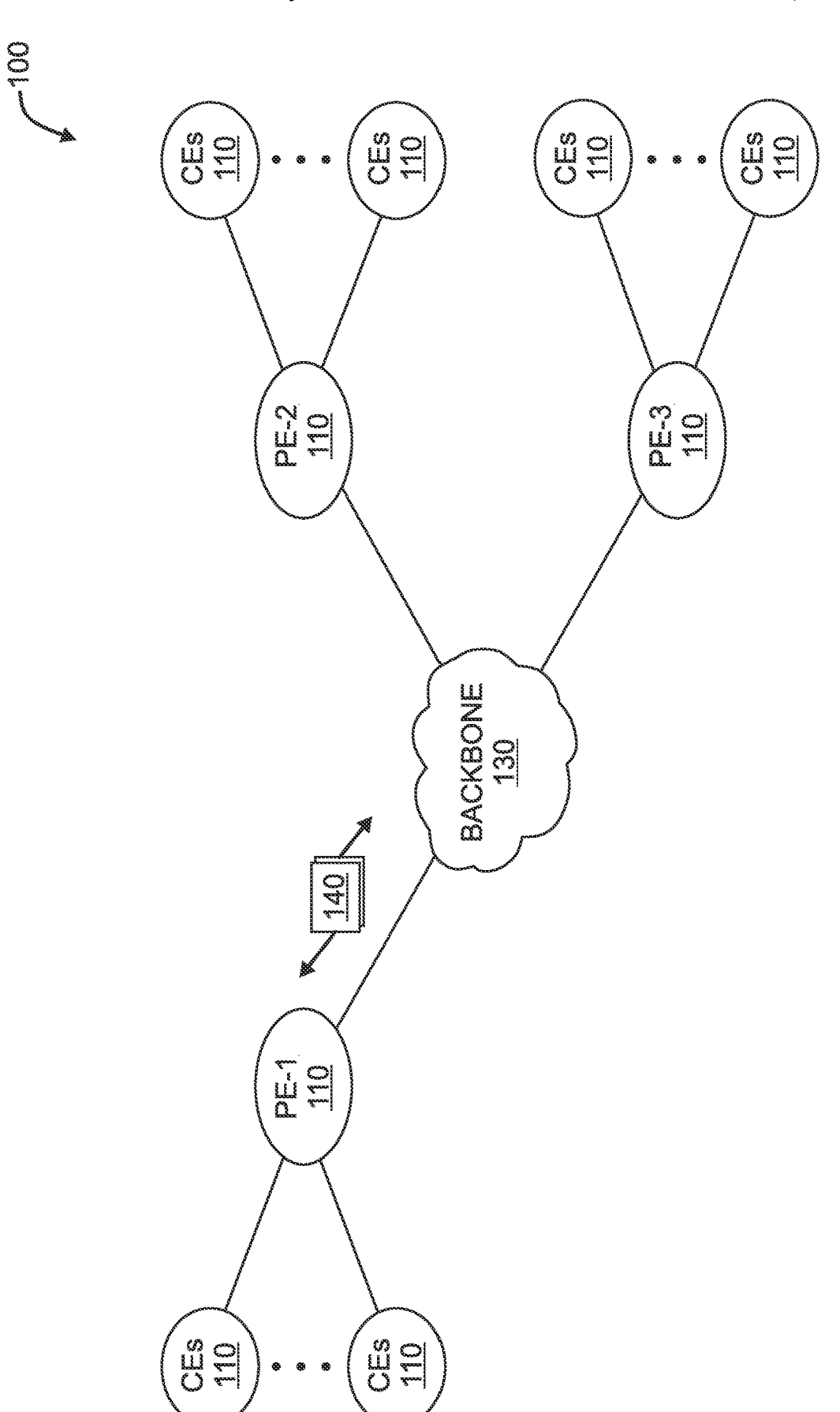
FIGS. 1A-1B illustrate an example communication network.

According to one or more embodiments of the disclosure, a device determines a type of content being accessed by an endpoint client within an online application during a particular period of time. The device selects a quality of experience prediction model for the online application, based on the type of content being accessed during the particular period of time. The device uses the quality of experience prediction model to predict a quality of experience metric for the online application. The device causes a configuration change in a network based on the quality of experience metric.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network by the CE router via two primary links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
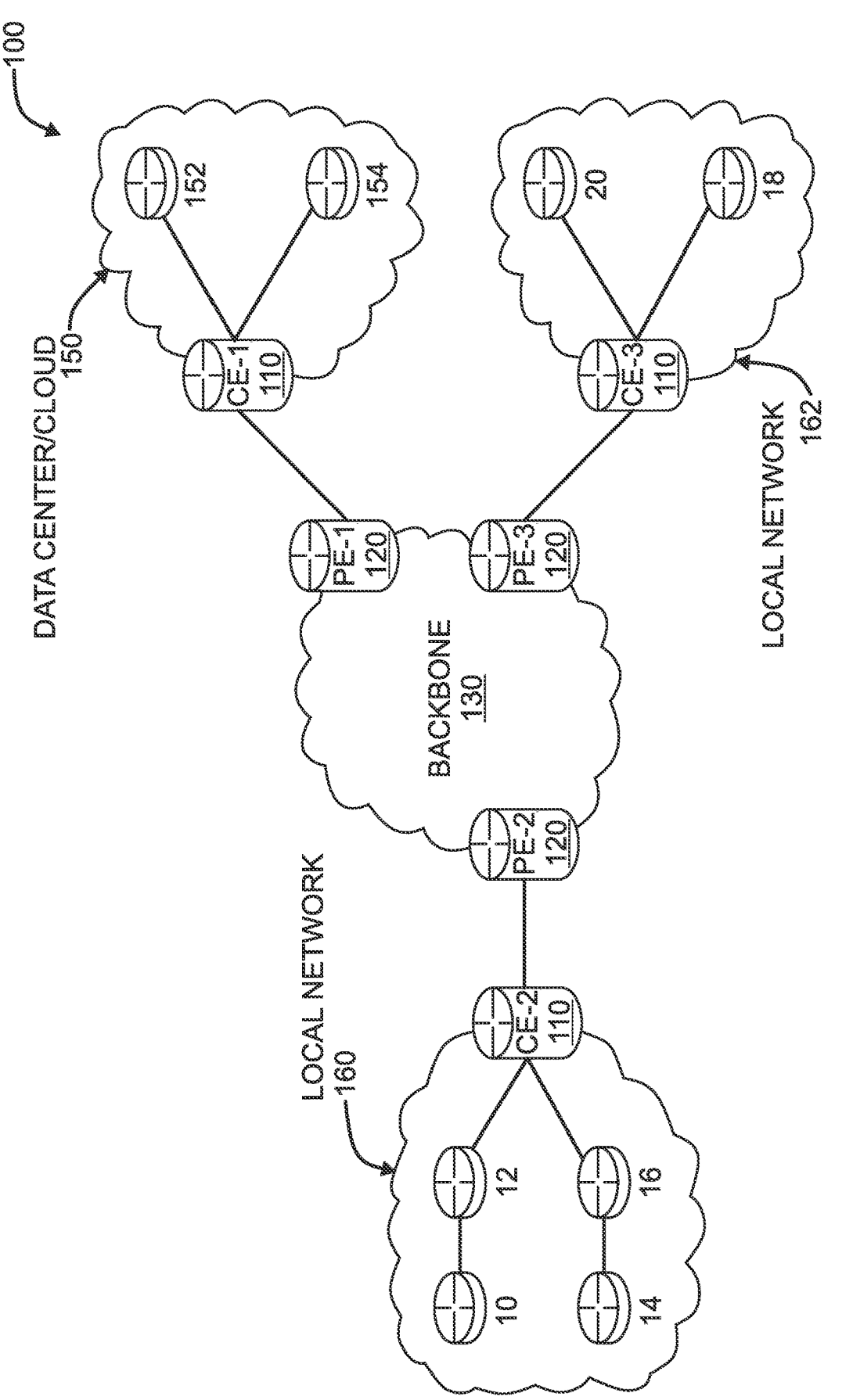

FIG. 1B illustrates an example of network 100 in greater detail, according to various embodiments. As shown, network backbone 130 may provide connectivity between devices located in different geographical areas and/or different types of local networks. For example, network 100 may comprise local networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

According to various embodiments, a software-defined WAN (SD-WAN) may be used in network 100 to connect local network 160, local network 162, and data center/cloud environment 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud environment 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud environment 150 on top of the various underlying connections. Another feature of SD-WAN is centralized management by a supervisory service that can monitor and adjust the various connections, as needed.

Figure 2:
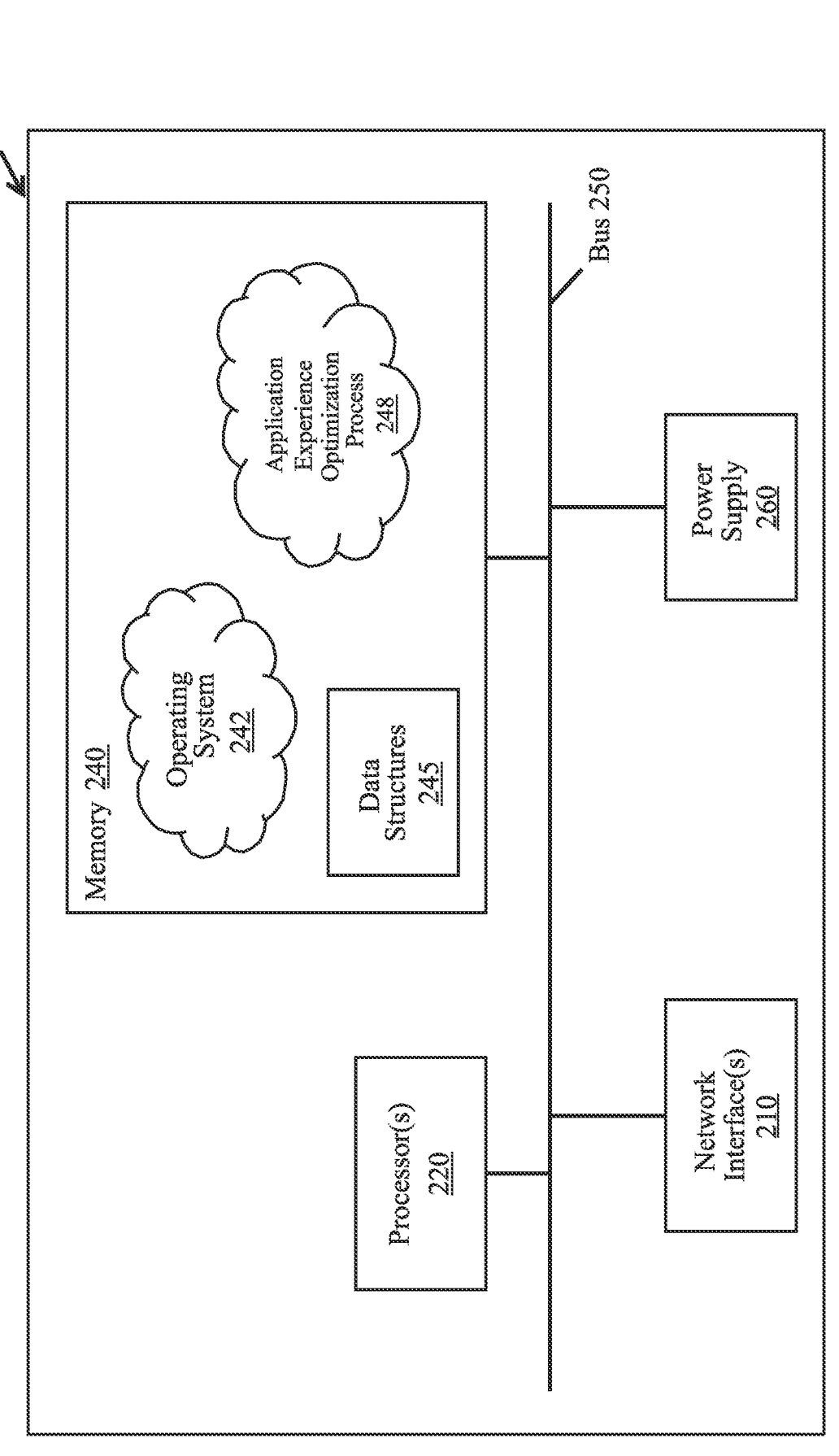
FIG. 2 illustrates an example network device/node.

FIG. 2 is a schematic block diagram of an example node/device 200 (e.g., an apparatus) that may be used with one or more embodiments described herein, e.g., as any of the computing devices shown in FIGS. 1A-1B, particularly the PE routers 120, CE routers 110, nodes/device 10-20, servers 152-154 (e.g., a network controller/supervisory service located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise an application experience optimization process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, application experience optimization process 248 may include computer executable instructions executed by the processor 220 to perform routing functions in conjunction with one or more routing protocols. These functions may, on capable devices, be configured to manage a routing/ forwarding table (a data structure 245) containing, e.g., data used to make routing/forwarding decisions. In various cases, connectivity may be discovered and known, prior to computing routes to any destination in the network, e.g., link state routing such as Open Shortest Path First (OSPF), or Intermediate-System-to-Intermediate-System (ISIS), or Optimized Link State Routing (OLSR). For instance, paths may be computed using a shortest path first (SPF) or constrained shortest path first (CSPF) approach. Conversely, neighbors may first be discovered (e.g., a priori knowledge of network topology is not known) and, in response to a needed route to a destination, send a route request into the network to determine which neighboring node may be used to reach the desired destination. Example protocols that take this approach include Ad-hoc On-demand Distance Vector (AODV), Dynamic Source Routing (DSR), DYnamic MANET On-demand Routing (DYMO), etc. Notably, on devices not capable or configured to store routing entries, application experience optimization process 248 may consist solely of providing mechanisms necessary for source routing techniques. That is, for source routing, other devices in the network can tell the less capable devices exactly where to send the packets, and the less capable devices simply forward the packets as directed.

In various embodiments, as detailed further below, application experience optimization process 248 may include computer executable instructions that, when executed by processor(s) 220, cause device 200 to perform the techniques described herein. To do so, in some embodiments, application experience optimization process 248 may utilize machine learning. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, application experience optimization process 248 may employ one or more supervised, unsupervised, or semi-supervised machine learning models. Generally, supervised learning entails the use of a training set of data, as noted above, that is used to train the model to apply labels to the input data. For example, the training data may include sample telemetry that has been labeled as being indicative of an acceptable performance or unacceptable performance. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that application experience optimization process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), generative adversarial networks (GANs), long short-term memory (LSTM), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for timeseries), random forest classification, or the like.

In further implementations, application experience optimization process 248 may also include one or more generative artificial intelligence/machine learning models. In contrast to discriminative models that simply seek to perform pattern matching for purposes such as anomaly detection, classification, or the like, generative approaches instead seek to generate new content or other data (e.g., audio, video/ images, text, etc.), based on an existing body of training data. For instance, in the context of network assurance, application experience optimization process 248 may use a generative model to generate synthetic network traffic based on existing user traffic to test how the network reacts. Example generative approaches can include, but are not limited to, generative adversarial networks (GANs), large language models (LLMs), other transformer models, and the like.

The performance of a machine learning model can be evaluated in a number of ways based on the number of true positives, false positives, true negatives, and/or false negatives of the model. For example, consider the case of a model that predicts whether the QoS of a path will satisfy the service level agreement (SLA) of the traffic on that path. In such a case, the false positives of the model may refer to the number of times the model incorrectly predicted that the QoS of a particular network path will not satisfy the SLA of the traffic on that path. Conversely, the false negatives of the model may refer to the number of times the model incorrectly predicted that the QoS of the path would be acceptable. True negatives and positives may refer to the number of times the model correctly predicted acceptable path performance or an SLA violation, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

As noted above, in software defined WANs (SD-WANs), traffic between individual sites are sent over tunnels. The tunnels are configured to use different switching fabrics, such as MPLS, Internet, 4G or 5G, etc. Often, the different switching fabrics provide different QoS at varied costs. For example, an MPLS fabric typically provides high QoS when compared to the Internet, but is also more expensive than traditional Internet. Some applications requiring high QoS (e.g., video conferencing, voice calls, etc.) are traditionally sent over the more costly fabrics (e.g., MPLS), while applications not needing strong guarantees are sent over cheaper fabrics, such as the Internet.

Traditionally, network policies map individual applications to Service Level Agreements (SLAs), which define the satisfactory performance metric(s) for an application, such as loss, latency, or jitter. Similarly, a tunnel is also mapped to the type of SLA that is satisfies, based on the switching fabric that it uses. During runtime, the SD-WAN edge router then maps the application traffic to an appropriate tunnel. Currently, the mapping of SLAs between applications and tunnels is performed manually by an expert, based on their experiences and/or reports on the prior performances of the applications and tunnels.

The emergence of infrastructure as a service (IaaS) and software-as-a-service (SaaS) is having a dramatic impact of the overall Internet due to the extreme virtualization of services and shift of traffic load in many large enterprises. Consequently, a branch office or a campus can trigger massive loads on the network.

Figure 3A:
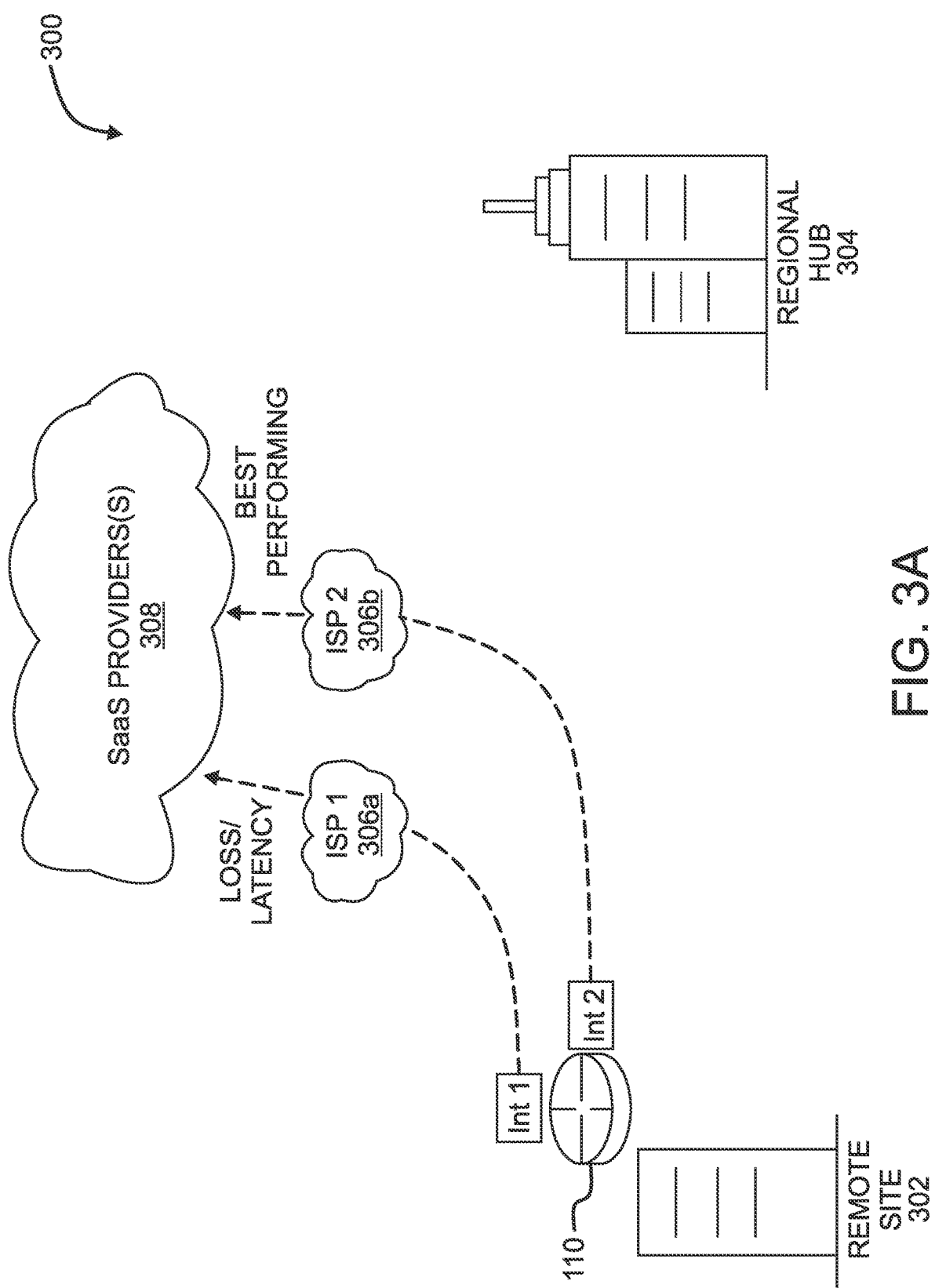
FIGS. 3A-3B illustrate example network deployments.
Figure 3B:
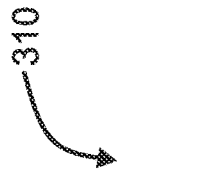

FIGS. 3A-3B illustrate example network deployments 300, 310, respectively. As shown, a router 110 located at the edge of a remote site 302 may provide connectivity between a local area network (LAN) of the remote site 302 and one or more cloud-based, SaaS providers 308. For example, in the case of an SD-WAN, router 110 may provide connectivity to SaaS provider(s) 308 via tunnels across any number of networks 306. This allows clients located in the LAN of remote site 302 to access cloud applications (e.g., Office 365™, Dropbox™, etc.) served by SaaS provider(s) 308.

As would be appreciated, SD-WANs allow for the use of a variety of different pathways between an edge device and an SaaS provider. For example, as shown in example network deployment 300 in FIG. 3A, router 110 may utilize two Direct Internet Access (DIA) connections to connect with SaaS provider(s) 308. More specifically, a first interface of router 110 (e.g., a network interface 210, described previously), Int 1, may establish a first communication path (e.g., a tunnel) with SaaS provider(s) 308 via a first Internet Service Provider (ISP) 306a, denoted ISP 1 in FIG. 3A. Likewise, a second interface of router 110, Int 2, may establish a backhaul path with SaaS provider(s) 308 via a second ISP 306b, denoted ISP 2 in FIG. 3A.

FIG. 3B illustrates another example network deployment 310 in which Int 1 of router 110 at the edge of remote site 302 establishes a first path to SaaS provider(s) 308 via ISP 1 and Int 2 establishes a second path to SaaS provider(s) 308 via a second ISP 306b. In contrast to the example in FIG. 3A, Int 3 of router 110 may establish a third path to SaaS provider(s) 308 via a private corporate network 306c (e.g., an MPLS network) to a private data center or regional hub 304 which, in turn, provides connectivity to SaaS provider(s) 308 via another network, such as a third ISP 306d.

Regardless of the specific connectivity configuration for the network, a variety of access technologies may be used (e.g., ADSL, 4G, 5G, etc.) in all cases, as well as various networking technologies (e.g., public Internet, MPLS (with or without strict SLA), etc.) to connect the LAN of remote site 302 to SaaS provider(s) 308. Other deployments scenarios are also possible, such as using Colo, accessing SaaS provider(s) 308 via Zscaler or Umbrella services, and the like.

Figure 4A:
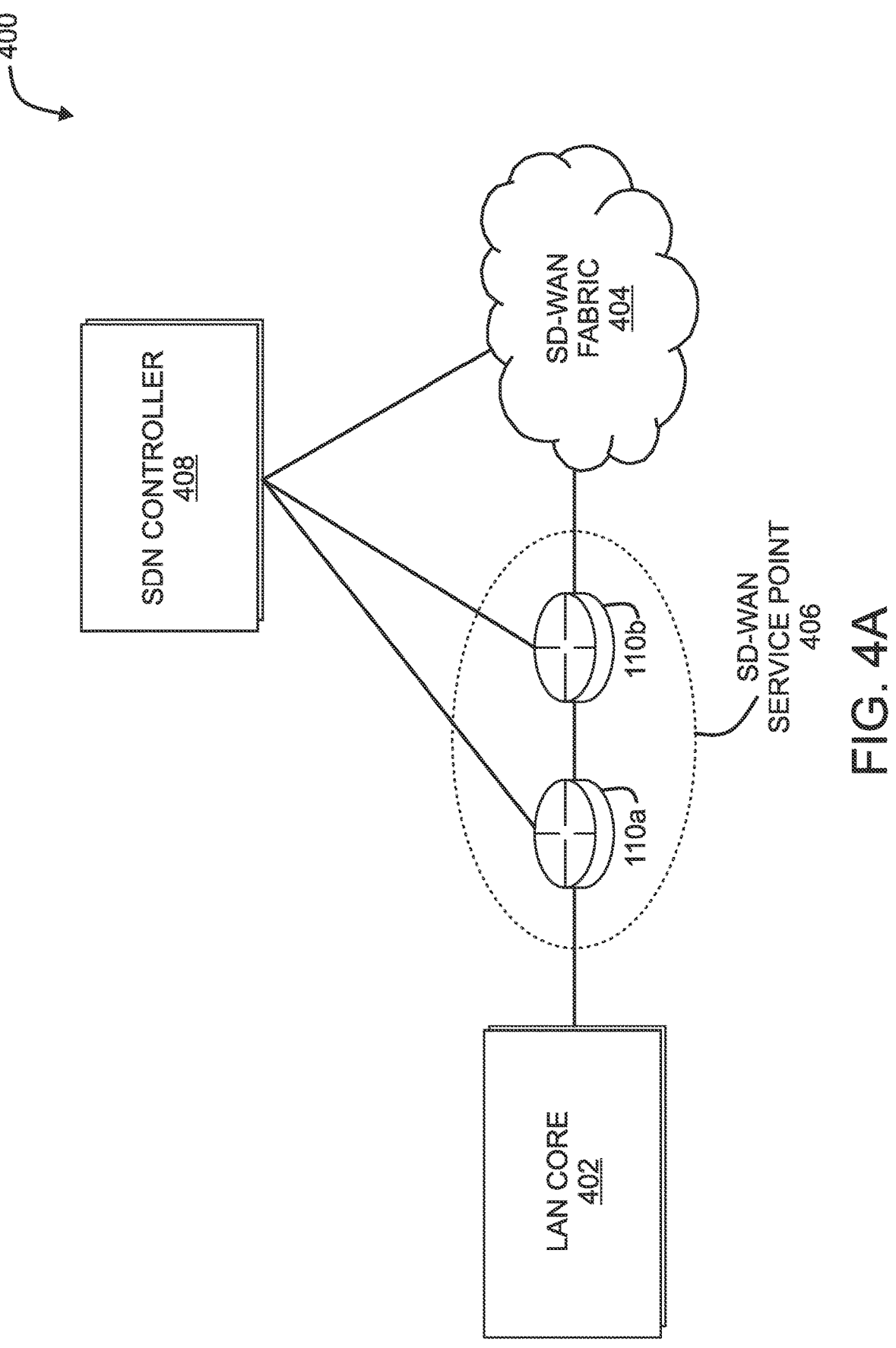
FIGS. 4A-4B illustrate example software defined network (SDN) implementations.

FIG. 4A illustrates an example SDN implementation 400, according to various embodiments. As shown, there may be a LAN core 402 at a particular location, such as remote site 302 shown previously in FIGS. 3A-3B. Connected to LAN core 402 may be one or more routers that form an SD-WAN service point 406 which provides connectivity between LAN core 402 and SD-WAN fabric 404. For instance, SD-WAN service point 406 may comprise routers 110a-110b.

Overseeing the operations of routers 110a-110b in SD-WAN service point 406 and SD-WAN fabric 404 may be an SDN controller 408. In general, SDN controller 408 may comprise one or more devices (e.g., a device 200) configured to provide a supervisory service, typically hosted in the cloud, to SD-WAN service point 406 and SD-WAN fabric 404. For instance, SDN controller 408 may be responsible for monitoring the operations thereof, promulgating policies (e.g., security policies, etc.), installing or adjusting IPsec routes/tunnels between LAN core 402 and remote destinations such as regional hub 304 and/or SaaS provider(s) 308 in FIGS. 3A-3B, and the like.

As noted above, a primary networking goal may be to design and optimize the network to satisfy the requirements of the applications that it supports. So far, though, the two worlds of "applications" and "networking" have been fairly siloed. More specifically, the network is usually designed in order to provide the best SLA in terms of performance and reliability, often supporting a variety of Class of Service (CoS), but unfortunately without a deep understanding of the actual application requirements. On the application side, the networking requirements are often poorly understood even for very common applications such as voice and video for which a variety of metrics have been developed over the past two decades, with the hope of accurately representing the Quality of Experience (QoE) from the standpoint of the users of the application.

More and more applications are moving to the cloud and many do so by leveraging an SaaS model. Consequently, the number of applications that became network-centric has grown approximately exponentially with the raise of SaaS applications, such as Office 365, ServiceNow, SAP, voice, and video, to mention a few. All of these applications rely heavily on private networks and the Internet, bringing their own level of dynamicity with adaptive and fast changing workloads. On the network side, SD-WAN provides a high degree of flexibility allowing for efficient configuration management using SDN controllers with the ability to benefit from a plethora of transport access (e.g., MPLS, Internet with supporting multiple CoS, LTE, satellite links, etc.), multiple classes of service and policies to reach private and public networks via multi-cloud SaaS.

Furthermore, the level of dynamicity observed in today's network has never been so high. Millions of paths across thousands of Service Provides (SPs) and a number of SaaS applications have shown that the overall QoS(s) of the network in terms of delay, packet loss, jitter, etc. drastically vary with the region, SP, access type, as well as over time with high granularity. The immediate consequence is that the environment is highly dynamic due to:

New in-house applications being deployed;

New SaaS applications being deployed everywhere in the network, hosted by a number of different cloud providers;

Internet, MPLS, LTE transports providing highly varying performance characteristics, across time and regions;

SaaS applications themselves being highly dynamic: it is common to see new servers deployed in the network. DNS resolution allows the network for being informed of a new server deployed in the network leading to a new destination and a potentially shift of traffic towards a new destination without being even noticed.

According to various embodiments, application aware routing usually refers to the ability to rout traffic so as to satisfy the requirements of the application, as opposed to exclusively relying on the (constrained) shortest path to reach a destination IP address. Various attempts have been made to extend the notion of routing, CSPF, link state routing protocols (ISIS, OSPF, etc.) using various metrics (e.g., Multi-topology Routing) where each metric would reflect a different path attribute (e.g., delay, loss, latency, etc.), but each time with a static metric. At best, current approaches rely on SLA templates specifying the application requirements so as for a given path (e.g., a tunnel) to be "eligible" to carry traffic for the application. In turn, application SLAs are checked using regular probing. Other solutions compute a metric reflecting a particular network characteristic (e.g., delay, throughput, etc.) and then selecting the supposed 'best path,' according to the metric.

The term 'SLA failure' refers to a situation in which the SLA for a given application, often expressed as a function of delay, loss, or jitter, is not satisfied by the current network path for the traffic of a given application. This leads to poor QoE from the standpoint of the users of the application. Modern SaaS solutions like Viptela, CloudonRamp SaaS, and the like, allow for the computation of per application QoE by sending HyperText Transfer Protocol (HTTP) probes along various paths from a branch office and then route the application's traffic along a path having the best QoE for the application. At a first sight, such an approach may solve many problems. Unfortunately, though, there are several shortcomings to this approach:

The SLA for the application is 'guessed,' using static thresholds.

Routing is still entirely reactive: decisions are made using probes that reflect the status of a path at a given time, in contrast with the notion of an informed decision.

SLA failures are very common in the Internet and a good proportion of them could be avoided (e.g., using an alternate path), if predicted in advance.

Figure 4B:
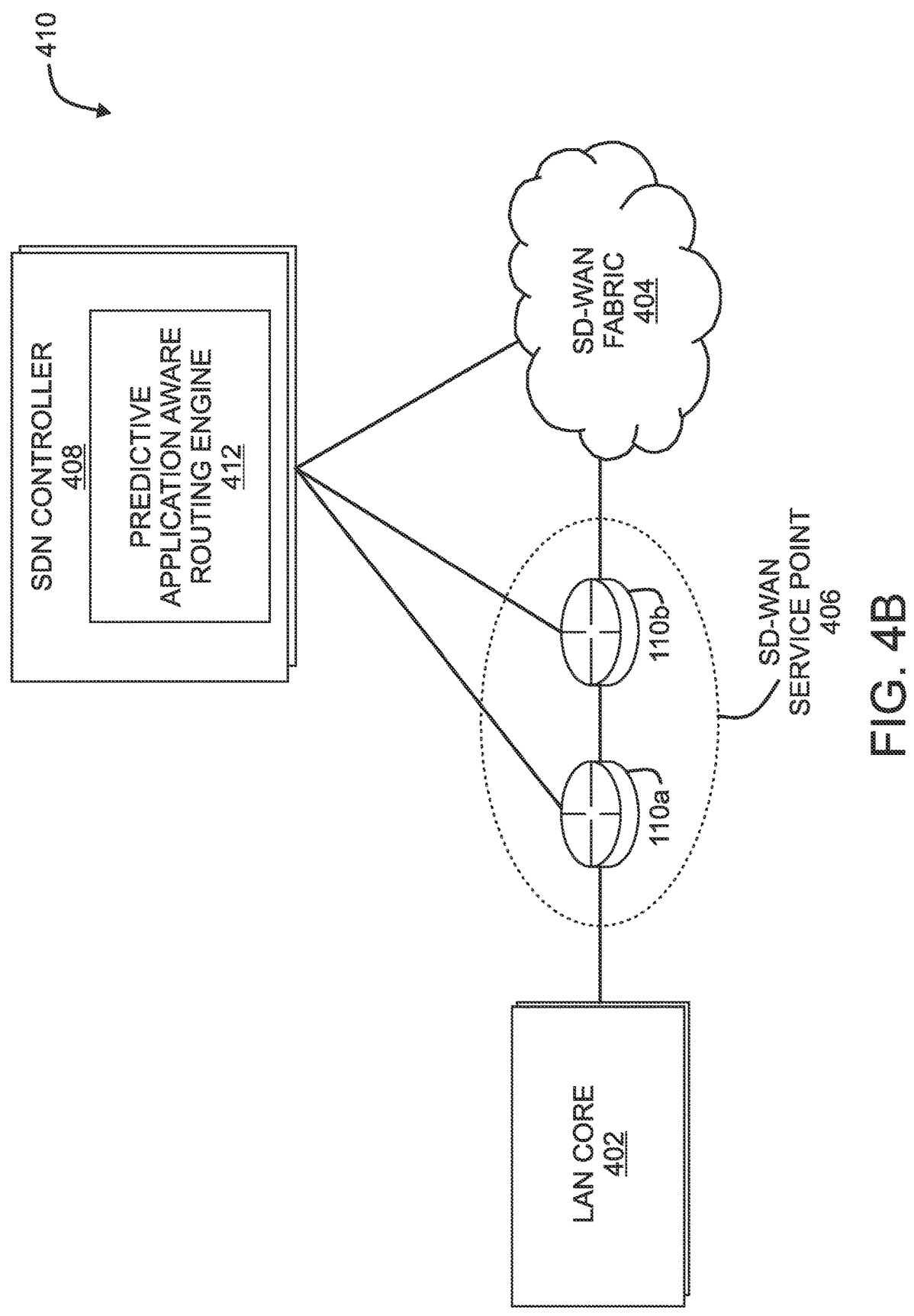

In various embodiments, the techniques herein allow for a predictive application aware routing engine to be deployed, such as in the cloud, to control routing decisions in a network. For instance, the predictive application aware routing engine may be implemented as part of an SDN controller (e.g., SDN controller 408) or other supervisory service, or may operate in conjunction therewith. For instance, FIG. 4B illustrates an example 410 in which SDN controller 408 includes a predictive application aware routing engine 412 (e.g., through execution of application experience optimization process 248). Further embodiments provide for predictive application aware routing engine 412 to be hosted on a router 110 or at any other location in the network.

During execution, predictive application aware routing engine 412 makes use of a high volume of network and application telemetry (e.g., from routers 110a-110b, SD-WAN fabric 404, etc.) so as to compute statistical and/or machine learning models to control the network with the objective of optimizing the application experience and reducing potential down times. To that end, predictive application aware routing engine 412 may compute a variety of models to understand application requirements, and predictably route traffic over private networks and/or the Internet, thus optimizing the application experience while drastically reducing SLA failures and downtimes.

In other words, predictive application aware routing engine 412 may first predict SLA violations in the network that could affect the QoE of an application (e.g., due to spikes of packet loss or delay, sudden decreases in bandwidth, etc.). In other words, predictive application aware routing engine 412 may use SLA violations as a proxy for actual QoE information (e.g., ratings by users of an online application regarding their perception of the application), unless such QoE information is available from the provider of the online application. In turn, predictive application aware routing engine 412 may then implement a corrective measure, such as rerouting the traffic of the application, prior to the predicted SLA violation. For instance, in the case of video applications, it now becomes possible to maximize throughput at any given time, which is of utmost importance to maximize the QoE of the video application. Optimized throughput can then be used as a service triggering the routing decision for specific application requiring highest throughput, in one embodiment. In general, routing configuration changes are also referred to herein as routing "patches," which are typically temporary in nature (e.g., active for a specified period of time) and may also be application-specific (e.g., for traffic of one or more specified applications).

As noted above, Enterprise networks have undergone a fundamental transformation whereby users and applications have become increasingly distributed thanks to technologies such as SD-WAN, Hybrid Work, and Zero Trust Network Access (ZTNA), and the like. Because of this, many applications have moved from on-premises deployments to a software-as-a-service (SaaS) cloud delivery model. Traditionally, service level agreement (SLA) thresholds regarding path metrics like loss, latency, and jitter, have been used as proxies for the user experience of such applications. For instance, if the packet loss is greater than a defined threshold, it is assumed that a user of the application would deem their experience with the application as unsatisfactory.

In this highly dynamic environment, the ability of network administrators to understand the impact of network performance (or lack of) on the QoE of online applications, as well as ensuring that the proper SLAs are satisfied, is becoming increasingly challenging. Indeed, in years past, network metrics were used as a proxy for the true application QoE, with SLAs being set, accordingly. For instance, in the case of a voice application, the usual SLA boundaries are 150 ms for delay, 50 ms for jitter, and maximum of 3% packet loss. Today, such values are not as clear-cut. For example, two real-time voice calls may have different loss thresholds based on the audio codec being used whereby a voice application that uses a lossy codec such as Opus may be resistant until a packet loss of up to 30%, whereas other audio codecs, such as advanced audio coding (AAC), are usually not resilient to such high loss thresholds.

Another factor that demonstrates the shortfalls of relying on SLA thresholds as a proxy for the true application QoE is that SLAs are set without any consideration to the granularity of their underlying measurements. For instance, a path experiencing a constant delay of 120 ms for voice over a period of 10 minutes provides a very different user experience than a path with the same average delay that keeps varying between 20 and 450 ms, despite averaging out to the same over the time period. The dynamics of such metrics is even more critical for packet loss and jitter in the case of voice and video traffic (e.g., ten seconds of 80% packet loss would severely impact the user experience although averaged out over ten minutes would give a low value totally acceptable according to the threshold). Without a doubt, the user experience requires a more subtle and accurate approach in order to determine the networking requirements a path should meet in order to maximize the user satisfaction, capturing local phenomenon (e.g., effects on delay, jitter and loss at higher frequencies) but also telemetry from upper layers (applications).

Traditionally, a core principle of the Internet has been layer isolation. Such an approach allowed layer dependency (e.g., often referred to as layer violation) to be avoided, at a time where a number of protocols and technologies were developed at each layer. More specifically, the Open Systems Interconnection (OSI) model divides networks into seven networking layers:

1. The Physical (PHY) Layer—the layer representing the physical connections between devices
2. The Data Link Layer—e.g., the layer at which MAC addressing is used
3. The Network Layer—e.g., the layer at which the IP protocol is used
4. The Transport Layer—e.g., the layer at which TCP or UDP
5. The Session Layer—e.g., the layer at which a given session between endpoints is managed
6. The Presentation Layer—e.g., the layer that translates requests from the application layer to the session layer and vice-versa
7. The Application Layer—e.g., the highest layer at which the application itself operates This allowed for the design and deployment of new layers (e.g., PHY, MAC, etc.) independent of each other, and allowing the Internet to scale. Still, with modern applications requiring tight SLAs, a cross-layer approach would be highly beneficial to optimizing the QoE of any given online application.

Further, even with a mechanism that is able to accurately estimate the application experience from the perspective of a user, another challenge still exists with respect to selecting the appropriate network action to improve the experience. Indeed, although the effect of specific actions at a given layer of the networking stack on user experience can be qualitatively evaluated, being able to precisely quantify it is often unknown. For instance, determining that voice quality is low along a highly congested path may be relatively easy. However, determining the correct amount of bandwidth to allocate to the path or the appropriate queue weight for the traffic of the application still remains quite challenging.

According to various embodiments, application experience optimization process 248 may leverage the concept of cognitive networking. Instead of taking a siloed approach where networking systems poorly understand user satisfaction, cognitive networks are fully driven by understanding user experience (cognition) using cross-layer telemetry and ground truth user feedback, in order to determine which networking actions can optimize the user experience. To that end, a rich set of telemetry sources are gathered along with labeled user feedback in order to train a machine learning model to predict/forecast the user experience (i.e., the QoE of an online application). Such a holistic approach that is end-to-end across the different network layers is a paradigm shift to how networks have been designed and operated since the early days of the Internet.

As noted above, cognitive networks represent an evolution over existing networking techniques by focusing on the true user experience of an online application, rather than attempting to infer this information from proxy information, such as SLA violations. The scope of cognitive networks is also not specific to just voice and video applications and can be expanded to other types of applications, as well. Of particular interest are web applications, where users interact with the application directly from a web browser and without the need for dedicated software, which is a popular way for users to interact with many SaaS services.

However, one challenge related to applying cognitive networks to online applications is the diversity and number in which they come. Indeed, there can be hundreds or even thousands of such applications in use in any single enterprise network environment, with applications being added or removed, constantly. Analyzing and building QoE models for thousands of individual applications poses scaling concerns in terms of both time and effort, while at the same time attempting to build a single QoE model that can cover all types of applications may be unfeasible.

Dynamic Classification of Online Applications Based on Application Behavior for Cognitive Networks The techniques herein introduce a methodology whereby a small number of pre-trained QoE models are applied to groups of applications with similar behavior (e.g., streaming, interactive, static content, etc.), forgoing the need for training large numbers of application-specific models and allowing cognitive networks to easily scale to hundreds, thousands, or even more applications in use. In some aspects, the techniques herein may use application telemetry in the form of HTTP archive resource (HAR) and/or real user monitor (RUM) traces, collected by network monitoring systems such as AppDynamics, ThousandEyes, or the like, to dynamically classify user traffic in real-time and assign the right behavior label and QoE model to the traffic. In some cases, the same application may also be assigned different behavior labels/QoE models at different times, based on specific user interactions. For example, in the case of an eLearning application, a user may first read some text-based instructions (static content), then view a video tutorial (media streaming), before finally solving a coding exercise (interactive). In such a case, the techniques herein may use different QoE models to determine the QoE for each stage of the user's interactions with the application.

Illustratively, the techniques described herein may be performed by hardware, software, and/or firmware, such as in accordance with application experience optimization process 248, which may include computer executable instructions executed by the processor 220 (or independent processor of interfaces 210) to perform functions relating to the techniques described herein.

Specifically, according to various embodiments, a device determines a type of content being accessed by an endpoint client within an online application during a particular period of time. The device selects a quality of experience prediction model for the online application, based on the type of content being accessed during the particular period of time. The device uses the quality of experience prediction model to predict a quality of experience metric for the online application. The device causes a configuration change in a network based on the quality of experience metric.

Figure 5:
FIG. 5 illustrates an example architecture for the dynamic classification of web applications based on application behavior for cognitive networks.

Operationally, FIG. 5 illustrates an example architecture 500 for the dynamic classification of web applications based on application behavior for cognitive networks, according to various embodiments. At the core of architecture 500 is application experience optimization process 248, which may be executed by a controller for a network or another device in communication therewith. For instance, application experience optimization process 248 may be executed by a controller for a network (e.g., SDN controller 408 in FIGS. 4A-4B), a particular networking device in the network (e.g., a router, a firewall, etc.), a server, another device or service in communication therewith, or the like.

As shown, application experience optimization process 248 may include any or all of the following components: a web application telemetry module 502, an application behavior classifier 504, and/or a QoE inference engine 506. As would be appreciated, the functionalities of these components may be combined or omitted, as desired. In addition, these components may be implemented on a singular device or in a distributed manner, in which case the combination of executing devices can be viewed as their own singular device for purposes of executing application experience optimization process 248.

In various implementations, web application telemetry module 502 may be responsible for collecting the application telemetry 508 regarding the online application being accessed by a particular endpoint client. For instance, application telemetry 508 may include telemetry such as HTTP Archive Resource (HAR) or Real User Monitoring (RUM) traces. More specifically, HAR can be used to retrieve any or all the following information included in SDN controller 408:

A list of all the resources that have been loaded by the browser of the endpoint client when accessing the online application (e.g., as HTML, CSS, Javascript, images, etc.).

Detailed timing information about each resource (e.g., when the endpoint client requested the resource, when the endpoint client started to download it, when it finished downloading, etc.).

The HTTP request and response headers for each resource.

The source of each resource (the URL it was loaded from).

Any cookies associated with each resource.

Etc.

HAR or RUM traces provide deep insights into the user activity for specific web applications, such as pages visited, content delivered as well detailed performance KPIs for each interaction (total load time, data transferred) and any potential errors encountered. By way of example, FIG. 7 illustrates an example screen capture 700 showing HAR telemetry collected by an agent. As shown, screen capture 700 shows the HAR telemetry in waterfall form, which shows the timing information for each resource accessed by a web browser.

Referring again to FIG. 5, web application telemetry module 502 may collect application telemetry 508 by leveraging one or more network monitoring utilities in the network, such as, but not limited to, an existing endpoint agent (e.g., to capture HAR telemetry), RUM agent (e.g., on the application server side or the endpoint client using a technique such as AJAX script injection), browser extension, or the like (e.g., In another embodiment, where the above-mentioned monitoring utilities may not be available, web application telemetry module 502 may instead deploy a dedicated endpoint agent or browser extension for execution by the endpoint client, which can be used to collect telemetry directly from the endpoint without the need for pre-existing infrastructure.

During ingestion of application telemetry 508, web application telemetry module 502 may perform various data normalization tasks across different telemetry sources before storing records in a common format and making them available for downstream components, such as application behavior classifier 504, and/or QoE inference engine 506.

Figure 6:
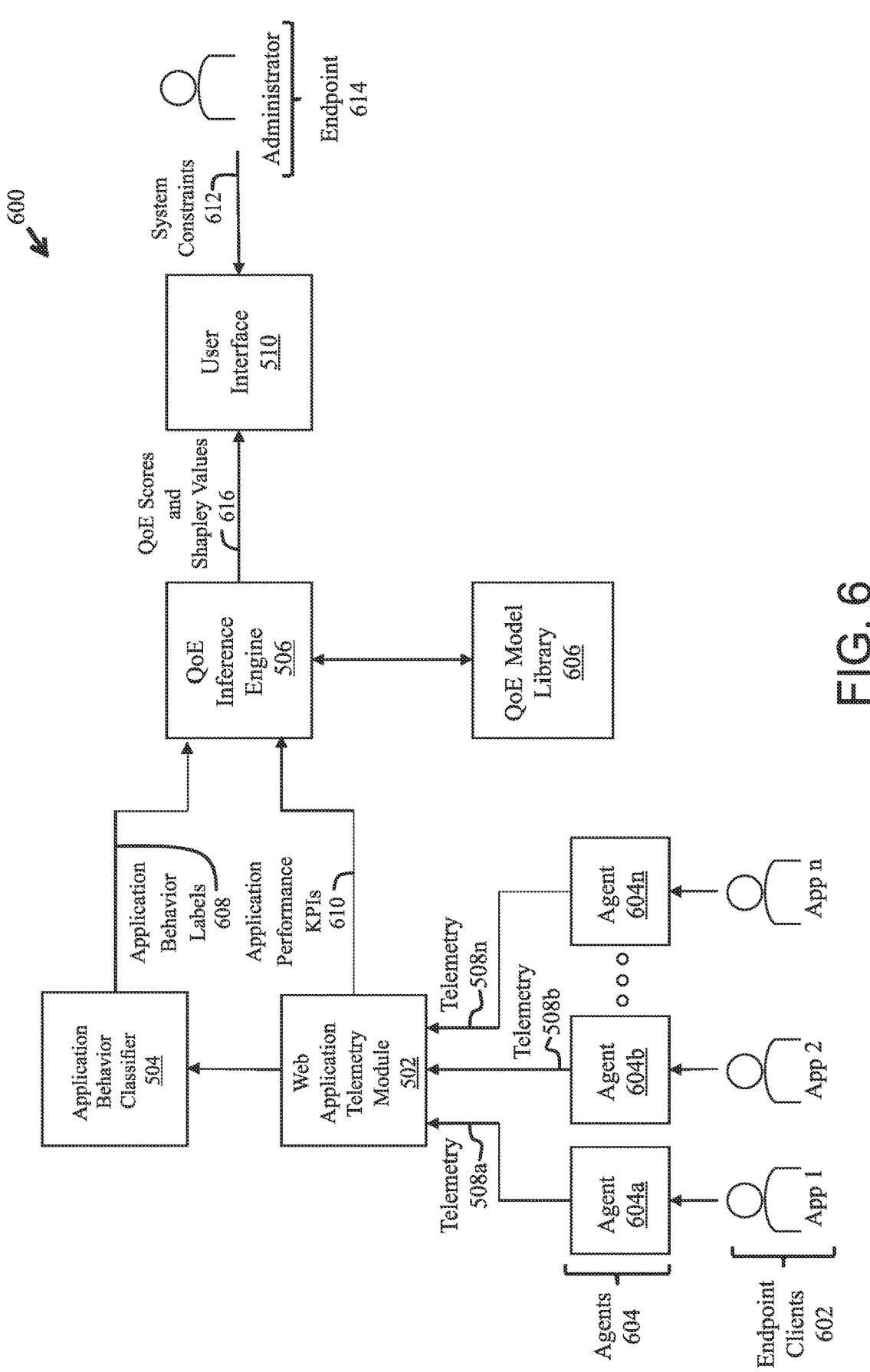
FIG. 6 illustrates an example of the interactions of the components of FIG. 5.

In various implementations, application behavior classifier 504 may take as input the telemetry records collected by application telemetry 508 and uses them to classify the behavior of the application during a particular interval of time (e.g., in terms of the type of content that the application provides to the endpoint client). By way of example, as shown in FIG. 6, assume that there are n-number of endpoint clients 602 of a given online application. In such a case, n-number of agents 604, such as agents 604a, 604b, through 604n, may each collect application telemetry 508 (e.g., telemetry 508a, telemetry 508b, through telemetry 508n, respectively), which provide the telemetry to web application telemetry module 502 for collection. As noted, agents 605 may take the form of server agents, endpoint agents or browser extensions executed by endpoint clients 602, and/or network agents, that collect information such as HAR telemetry, RUM telemetry, or the like.

Based on application telemetry 508, application behavior classifier 504 may assign one or more behavioral groups to the online application for a given time period, such as any or all of the following that are indicative of the type(s) of content being accessed within the application:

Video streaming content: the application (or webpage of the application) may provide some sort of long-term video streaming (e.g., YouTube, Netflix, Hulu, Twitch, etc.).

Media sharing content: the application may provide lots of very short, non-interactive content, such as pictures or short videos (e.g., Instagram, Twitter, Tik Tok, etc.).

Interactive content: the application may include interactive content whereby users need to perform lots of actions such as clicking on buttons, building quotes, etc., which may require lots of continuous interaction between the application and backend databases or applications (e.g., CRMs, Service Now, SAP, ticketing systems, web shops etc.).

Static content: the application may also include content that is static and non-interactive (e.g., technology blogs, Wikis, news apps, etc.).

Collaboration content: the application may provide content that multiple users may collaborate to create, edit, etc. (e.g., PowerPoint online, Google Sheets/Slides, etc.).

Low-latency data streaming content: the application may include content intended to be streamed with low-latency (e.g., stocks, train schedules, airport schedules, monitoring tools etc.).

In effect, by classifying the behaviors/types of content associated with the online application, similar applications may fall within the same classification (e.g., Netflix, You-Tube, Hulu, etc. may all have the same classification, since they all provide streaming content. Each application may belong to a single behavior group at any point in time. However, in some instances, that group may also change over time based on the type of user interaction. For example, in the case of an eLearning application, a user may first read some text-based instructions (static content) during a first time period, then view a video tutorial (media streaming) during a second time period, before finally solving a coding exercise (interactive) during a third time period. In such cases, application behavior classifier 504 may update the type classification, accordingly.

In one embodiment, application behavior classifier 504 may rely on a rules-based mechanism to assign application behavior labels 608 to each application based on a set of predefined heuristics such as number of pages, type of content delivered, amount of traffic rate, time between user actions, or the like.

In a second embodiment, application behavior classifier 504 may use a more sophisticated, pre-trained machine learning classifier model to categorize applications into groups and assign application behavior labels 608 to them. Such a model could be offered natively as part of application behavior classifier 504 or updated periodically, similar to how application signatures are published today for purposes of network-based application recognition.

In yet another embodiment, application behavior classifier 504 may leverage unsupervised learning to automatically discover groups of applications with similar behaviors. In particular, application behavior classifier 504 could use clustering techniques to discover new groups, in addition to the "built-in" groups mentioned above, or to override them completely in a data-driven manner.

As shown in FIGS. 5-6, QoE inference engine 506 may be responsible for inferring the QoE metric (e.g., a score) for each application of interest. To do so, QoE inference engine 506 may take as input the application behavior labels 608 from application behavior classifier 504 and may also ingest application performance key performance indicators (KPIs) 610 indicated by the application telemetry 508 collected by web application telemetry module 502. In turn, based on application telemetry 508, QoE inference engine 506 may select the most appropriate QoE prediction model to infer the QoE metric (e.g., based on KPIs 610).

In some instances, the QoE prediction models used by QoE inference engine 506 could be gathered from different sources. In one case, a network administrator may choose to train models that are proprietary to its own network environment by utilizing a variety of different methodologies. In another case, pre-trained and ready-to-use models could be published by network vendors (e.g., Cisco) via an application programming interface (API) and consumed directly by QoE inference engine 506. In other words, as shown in FIG. 6, QoE inference engine 506 may select a particular QoE prediction model from amongst a set of available from a QoE model library 606, which may be internal or external to QoE inference engine 506.

Regardless of the source of the QoE models, the outputs 616 of QoE inference engine 506 may take the form of QoE metrics, which may form a timeseries of such metrics for the online application. In addition, QoE inference engine 506 may also compute associated scores for inclusion in its outputs 616, such as Shapley values for each contributing KPI, provide additional insights into the metrics with the highest weight.

Additionally, as shown in FIGS. 5-6, application experience optimization process 248 may also interact with a user interface 510 operated by a network administrator via an endpoint 614. In general, user interface 510 may serve two roles. First, user interface 510 may present outputs 616 to endpoint 614 for review, allowing the administrator to determine whether any configuration changes need to be made (e.g., to any of endpoint clients 602, to the network itself, such as by rerouting traffic for the online application, changes to the application server, etc.). Of course, in further implementation, such configuration changes could also be implemented automatically, based on outputs 616, as well (e.g., by providing outputs 616 directly to predictive application aware routing engine 412 in FIG. 4B, etc.).

Another function of user interface 510 may also be to allow the administrator operating endpoint 614 to specify system constraints 612. For instance, the administrator may specify constraints in terms of which online applications are of interest, any 3rd party integrations to collect application telemetry 508, QoE model providers, or the like.

In some instances, user interface 510 may also report to the administrator situations in which QoE inference engine 506 oscillates between using different QoE models for the same application. This could, for instance, indicate that a new QoE prediction model should be trained for that application. In turn, the administrator may initiate such training, as desired.

Figure 8:
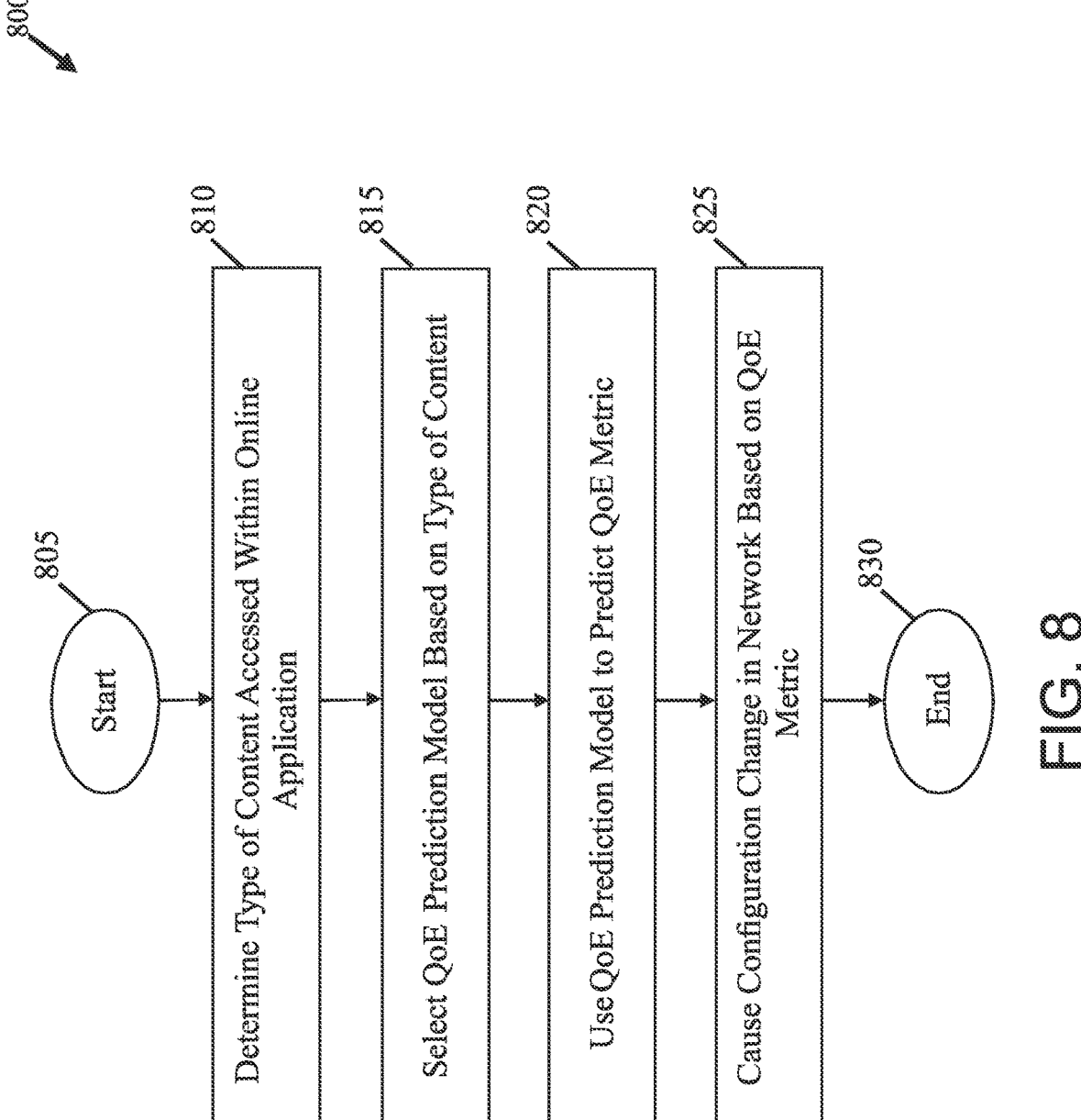
FIG. 8 illustrates an example simplified procedure for the dynamic classification of web applications based on application behavior for cognitive networks.

FIG. 8 illustrates an example simplified procedure 800 (e.g., a method) procedure for the dynamic classification of web applications based on application behavior for cognitive networks, in accordance with one or more embodiments described herein. For example, a non-generic, specifically configured device (e.g., device 200), such as a router, firewall, controller for a network (e.g., an SDN controller or other device in communication therewith), server, or the like, may perform procedure 800 by executing stored instructions (e.g., application experience optimization process 248). The procedure 800 may start at step 805, and continues to step 810, where, as described in greater detail above, the device may determine a type of content being accessed by an endpoint client within an online application during a particular period of time. In some instances, the endpoint client accesses the online application via a web browser. In various implementations, the device determines the type of content based on Hypertext Transfer Protocol (HTTP) archive resource (HAR) telemetry or real user monitoring (RUM) telemetry. In one implementation, the device uses a machine learning-based classifier to determine the type of content being accessed by an endpoint client within an online application during a particular period of time. In other cases, the device may use a rule-based system to do so. In one implementation, the device determines the type of content based on telemetry collected by an agent executed by the endpoint client.

At step 815, as detailed above, the device may select a quality of experience prediction model for the online application, based on the type of content being accessed during the particular period of time. In some implementations, the device accesses the quality of experience prediction model via an application programming interface (API). In various cases, the type of content comprises at least one of: video streaming content, media sharing content, collaboration content, low latency data streaming content, or static content.

At step 820, the device may use the quality of experience prediction model to predict a quality of experience metric for the online application, as described in greater detail above. In various implementations, the device may also determine that the endpoint client accessed a different type of content during a subsequent period of time to that of the particular period of time. In turn, the device may use a second quality of experience prediction model selected based on the different type of content to update the quality of experience metric for the online application. In such cases, the device may also provide an indication to a user interface that the device oscillates between using the quality of experience prediction model and the second quality of experience prediction model to predict the quality of experience metric for the online application.

At step 825, as detailed above, the device may cause a configuration change in a network based on the quality of experience metric. In some instances, the device may do so by providing the quality of experience metric for the online application to a user interface for review by an administrator. In turn, a network administrator may opt to make the configuration change (e.g., reroute the application traffic, reconfigure the endpoint client, etc.). In other instances, the device may provide the quality of experience metric to a system that automatically implements the configuration change (e.g., a cognitive network system, etc.).

Procedure 800 then ends at step 830.

It should be noted that while certain steps within procedure 800 may be optional as described above, the steps shown in FIG. 8 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

While there have been shown and described illustrative embodiments that provide for the dynamic classification of web applications based on application behavior for cognitive networks, it is to be understood that various other adaptations and modifications may be made within the spirit and scope of the embodiments herein. For example, while certain embodiments are described herein with respect to using certain models for purposes of predicting application experience metrics, SLA violations, or other disruptions in a network, the models are not limited as such and may be used for other types of predictions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

The invention claimed is:

1. A method comprising:

determining, by a device, a type of content being accessed by an endpoint client within an online application during a particular period of time;

selecting, by the device and based on the type of content being accessed during the particular period of time, a quality of experience prediction model for the online application from a plurality of quality of experience prediction models, wherein the plurality of quality of experience prediction models are configured to predict quality of experience metrics for applications accessing a respective type of content;

using, by the device, the quality of experience prediction model to predict a quality of experience metric for the online application when the type of content is being accessed; and causing, by the device, a configuration change in a network based on the quality of experience metric.

2. The method as in claim 1, wherein the endpoint client accesses the online application via a web browser.

3. The method as in claim 1, wherein the device determines the type of content based on Hypertext Transfer Protocol (HTTP) archive resource (HAR) telemetry or real user monitoring (RUM) telemetry.

4. The method as in claim 1, wherein the device accesses the quality of experience prediction model via an application programming interface (API).

5. The method as in claim 1, further comprising:

determining, by the device, that the endpoint client accessed a different type of content during a subsequent period of time to that of the particular period of time; and using, by the device, a second quality of experience prediction model selected based on the different type of content to update the quality of experience metric for the online application.

6. The method as in claim 5, further comprising:

providing, by the device, an indication to a user interface that the device oscillates between using the quality of experience prediction model and the second quality of experience prediction model to predict the quality of experience metric for the online application.

7. The method as in claim 1, wherein the device uses a machine learning-based classifier to determine the type of content being accessed by the endpoint client within the online application during the particular period of time.

8. The method as in claim 1, wherein the type of content comprises at least one of: video streaming content, media sharing content, collaboration content, low latency data streaming content, or static content.

9. The method as in claim 1, wherein the device determines the type of content based on telemetry collected by an agent executed by the endpoint client.

10. The method as in claim 1, wherein causing the configuration change comprises:

providing the quality of experience metric for the online application to a user interface for review by an administrator.

11. An apparatus, comprising:

one or more network interfaces;

a processor coupled to the one or more network interfaces and configured to execute one or more processes; and a memory configured to store a process that is executable by the processor, the process when executed configured to:

determine a type of content being accessed by an endpoint client within an online application during a particular period of time;

select, based on the type of content being accessed during the particular period of time, a quality of experience prediction model for the online application from a plurality of quality of experience prediction models, wherein the plurality of quality of experience prediction models are configured to predict quality of experience metrics for applications accessing a respective type of content;

use the quality of experience prediction model to predict a quality of experience metric for the online application when the type of content is being accessed; and cause a configuration change in a network based on the quality of experience metric.

12. The apparatus as in claim 11, wherein the endpoint client accesses the online application via a web browser.

13. The apparatus as in claim 11, wherein the apparatus determines the type of content based on Hypertext Transfer Protocol (HTTP) archive resource (HAR) telemetry or real user monitoring (RUM) telemetry.

14. The apparatus as in claim 11, wherein the apparatus accesses the quality of experience prediction model via an application programming interface (API).

15. The apparatus as in claim 11, wherein the process when executed is further configured to:

determine that the endpoint client accessed a different type of content during a subsequent period of time to that of the particular period of time; and use a second quality of experience prediction model selected based on the different type of content to update the quality of experience metric for the online application.

16. The apparatus as in claim 15, wherein the process when executed is further configured to:

provide an indication to a user interface that the apparatus oscillates between using the quality of experience prediction model and the second quality of experience prediction model to predict the quality of experience metric for the online application.

17. The apparatus as in claim 11, wherein the apparatus uses a machine learning-based classifier to determine the type of content being accessed by the endpoint client within the online application during the particular period of time.

18. The apparatus as in claim 11, wherein the type of content comprises at least one of: video streaming content, media sharing content, collaboration content, low latency data streaming content, or static content.

19. The apparatus as in claim 11, wherein the apparatus determines the type of content based on telemetry collected by an agent executed by the endpoint client.

20. A tangible, non-transitory, computer-readable medium storing program instructions that cause a device to execute a process comprising:

determining, by the device, a type of content being accessed by an endpoint client within an online application during a particular period of time;

selecting, by the device and based on the type of content being accessed during the particular period of time, a quality of experience prediction model for the online application from a plurality of quality of experience prediction models, wherein the plurality of quality of experience prediction models are configured to predict quality of experience metrics for applications accessing a respective type of content;

using, by the device, the quality of experience prediction model to predict a quality of experience metric for the online application when the type of content is being accessed; and causing, by the device, a configuration change in a network based on the quality of experience metric.

* * * * *